United States Patent [19]

Belart

[11] 4,362,339

[45] Dec. 7, 1982

[54] HYDRAULIC BRAKE SYSTEM WITH AN ANTISKID CONTROL APPARATUS

[75] Inventor: Juan Belart, Walldorf, Fed. Rep. of Germany

[73] Assignee: ITT Industries, Inc., New York, N.Y.

[21] Appl. No.: 227,895

[22] Filed: Jan. 23, 1981

[30] Foreign Application Priority Data

Mar. 20, 1980 [DE] Fed. Rep. of Germany ....... 3010639

[51] Int. Cl.$^3$ .............................................. B60T 8/08
[52] U.S. Cl. ..................................... 303/117; 303/113
[58] Field of Search .................. 188/181 A; 303/113, 303/115, 116, 117, 119

[56] References Cited

U.S. PATENT DOCUMENTS

| | | | |
|---|---|---|---|
| 3,514,161 | 5/1970 | Frayer | 303/117 |
| 3,671,085 | 6/1972 | Pasek et al. | 303/115 |
| 3,702,713 | 11/1972 | Oberthur | 303/117 |
| 4,168,100 | 9/1979 | Yama | 188/181 A X |

Primary Examiner—Duane A. Reger
Attorney, Agent, or Firm—John T. O'Halloran; Alfred C. Hill

[57] ABSTRACT

Brake systems having an antiskid control apparatus are known in which pressure fluid is additionally supplied from a dynamic circuit into the static brake circuit when pressure fluid has been taken therefrom due to an antiskid control operation. In this situation, the known systems were not able to maintain the master cylinder pressure at a constant value. Therefore, according to the present invention a valve device is provided which is acted upon by the static master cylinder pressure in the opening direction and by the dynamic auxiliary pressure in the closing direction.

13 Claims, 2 Drawing Figures

HYDRAULIC BRAKE SYSTEM WITH AN ANTISKID CONTROL APPARATUS

BACKGROUND OF THE INVENTION

The present invention relates to a hydraulic brake system comprising an antiskid control apparatus, a master cylinder and at least one wheel cylinder, with the wheel cylinder being adapted to be connected to the master cylinder or a fluid outlet via antiskid control valves.

Brake systems of this type are known, for example, from the magazines "Automobil-Technik" of Oct. 30, 1978, pages 28 to 30, and "Automobiltechnische Zeitschrift" 81 (1979) 5, pages 201 to 208. In these magazines, brake systems are described in which a recirculating pump feeds the fluid returned to the master cylinder pressure chamber under high pressure. As a result of this arrangement, once the wheel cylinder is disconnected from the master cylinder, the fluid volume returned causes a volume increase in the master cylinder pressure chamber. This volume increase in the pressure chamber resets the master cylinder piston, the brake pedal moves in opposition to its actuating direction. Such pulsating brake pedal movements by no means appeal to the vehicle operator, they impair the pedal feeling considerably and affect the application of a dosed brake pressure adversely.

SUMMARY OF THE INVENTION

It is therefore an object of the present invention to supply the fluid required during an antiskid control action to the wheel brake cylinder of a conventional brake system such that the volume of the master cylinder pressure chamber remains unchanged.

A feature of the present invention is the provision of a hydraulic brake system having an antiskid control apparatus comprising a master brake cylinder; a fluid return line; at least one wheel brake cylinder; antiskid control valves coupled to the master cylinder, the wheel cylinder and the return line to connect the wheel cylinder to one of the master cylinders and the return line; and a valve device coupled to a fluid source, the master cylinder and the return line to deliver fluid from the fluid source to the wheel brake cylinder through at least one check valve opening in opposition to master cylinder pressure, the valve device being controlled by a piston having a first end surface acted upon by the master cylinder pressure in the sense of opening the valve device and a second end surface acted upon by the pressure of the fluid of the source in the sense of closing the valve device.

Whenever a substantial amount of fluid is required for the purpose of building up pressure again in a wheel cylinder after an antiskid control operation has taken place, the above arrangement causes the required fluid to be supplied through the check valve rather than being withdrawn from the master cylinder. By arranging the valve device to be controlled by a piston acted upon by hydraulic pressure, it is achieved that the fluid pressure present at the check valve is adapted to the pressure in the master cylinder. Therefore, during normal brake application, the fluid pressure present at the check valve approximates the pressure in the master cylinder, conditioned by the piston acted upon by pressure. Only when the pressure in the master cylinder drops can the check valve open, enabling the required fluid volume to be supplied to the master cylinder directly. The decrease in the fluid pressure acting on the check valve is accomplished via the master cylinder.

In order to realize the highest possible energy savings, the fluid source will deliver fluid only on actuation of the master cylinder. Such control elements may shut off the drive for the fluid source by electrical and/or mechanical means.

Because the fluid source is a fluid accumulator whose fluid flow to the valve device is ducted through a valve opening at the beginning of a braking action and closing on termination of a braking action, a constant-pressure fluid volume may be withdrawn by the brake system at all times. With a simple valve function, controlled delivery of fluid to the brake system is possible via a favorably constructed valve in which the piston acts as a valve slide, with the fluid admitted through the inlet located in the housing being deliverable to the outlet of the valve device through a channel system in the piston, or the inlet being adapted to be closed by the piston.

In a particularly favorable embodiment, the pressure chamber bounded by the second end surface of the piston and the housing communicates with the outlet of the valve device through a channel in the piston. This avoids the need for an external pressure pipe. By arranging the pressure chamber as an outlet chamber, the space additionally provided as the outlet chamber is no longer necessary, the valve device becomes simpler per se and thus more economical.

Because with the valve device in the open position the piston closes a fluid connection to an unpressurized compartment which will be opened with the valve device closed, it is possible to adapt the pressure to the master cylinder pressure without appreciable error. It is possible to reduce the residual pressure which remains on a pressure decrease via the master cylinder as a result of the check valves, fully and independently of the master cylinder. This pressure decrease may be accomplished substantially faster than a pressure decrease via the master cylinder.

It will be an advantage to arrange the check valve in the piston, thereby obviating the need for an external fluid line and resulting in a space-saving construction.

Further, it is advisable from the engineering point of view to arrange for limiting the displacement travel of the piston by means of axial stops so that in the event of abrupt pressure changes occurring in extreme situations the valve device is assigned a defined position in which operability is ensured. Still further, it will be advantageous to arrange for the piston to rest against the stop in its open position such that the fluid inlet is only partially open. In this manner, a throttling effect is achieved, permitting a high-pressure accumulator to be utilized because then a smooth pressure adaptation is possible. The use of such a high-pressure accumulator allows relatively long intervals between the individual accumulator charging cycles and, thus, the pump drive need not be actuated so often.

It will also be an advantage to supply the fluid to the valve device through a valve which is controlled electro-magnetically and/or hydraulically. If a valve is provided which is adapted to be driven by an electric pulse and returns to its closed state in the presence of specific hydraulic conditions, this valve may be opened by a control signal of the antiskid control apparatus and closed again with the master cylinder in the unpressurized state. By controlling the fluid flow in such a manner, it is achieved that the valve device is actuated only on demand, thereby precluding fluid losses in the valve device with no fluid flow required. Thus, in the use of such a brake system, it may be indeed possible that the pump system charges the pressure accumulator when the vehicle is started, after which it is only required to compensate for the very minor losses of the pressure accumulator. By this arrangement the pump drive is actuated relatively rarely, resulting in energy savings.

BRIEF DESCRIPTION OF THE DRAWINGS

Above-mentioned and other features and objects of this invention will become more apparent by reference to the following description taken in conjunction with the accompanying drawing, in which.

DESCRIPTION OF THE PREFERRED EMBODIMENTS

Figure 1:
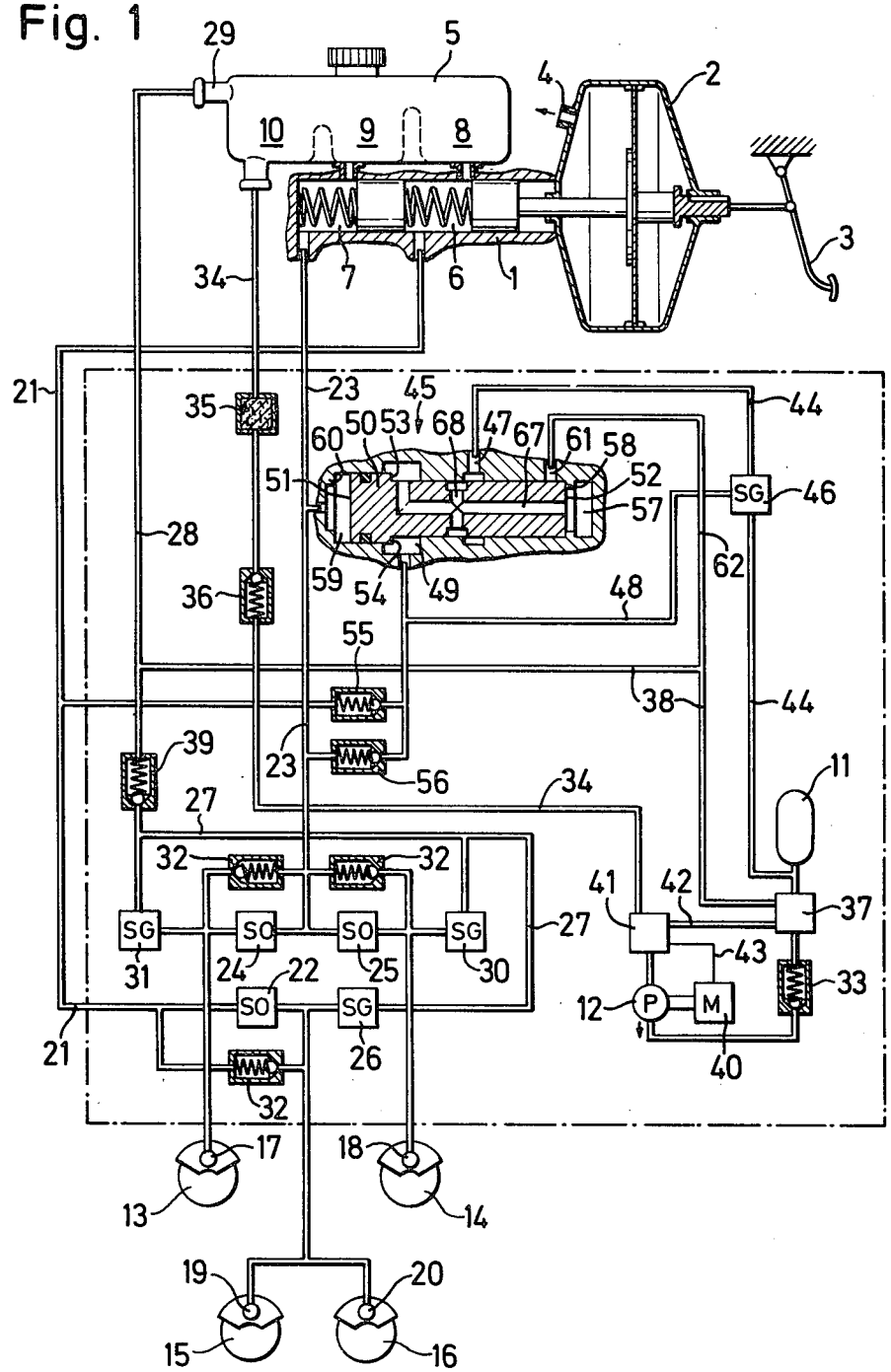
FIG. 1 is a schematic diagram of a power-assisted hydraulic brake system in accordance with the principles of the present invention.

In FIG. 1, reference number 1 designates a master cylinder and reference number 2 designates a vacuum brake booster inserted upstream from master cylinder 1. Via a port 4, vacuum brake booster 2 is connected to a vacuum source providing the power assistance. The arrangement comprising vacuum brake booster 1 and master cylinder 1 connected downstream therefrom is controlled by a brake pedal 3. Mounted on master cylinder 1 is a fluid reservoir 5 which is connected to pressure chambers 6 and 7 of master cylinder 1 through breather bores not shown.

Fluid reservoir 5 is preferably subdivided into three compartments 8, 9 and 10 which are interconnected by overflow pipes. In this arrangement, compartment 8 is assigned to pressure chamber 6 via a breather bore, compartment 9 to chamber 7 via another breather bore, and compartment 10 serves as a sump which via a pump 12 feeding the fluid into a pressure accumulator 11.

The master cylinder chambers are connected to the brake actuating members 17 to 20 of vehicle wheels 13 to 16. Via a pressure line 21 and a solenoid valve 22 which is open in the de-energized state, pressure chamber 6 supplies pressure to wheel cylinders 19, 20 of rear wheels 15, 16. Via line 23 and solenoid valves 24 and 25 which are open in the de-energized state, pressure chamber 7 supplies pressure to brake-actuating members 17 and 18 of front wheels 13 and 14. Associated with brake-actuating members 19 and 20 of rear wheels 15 and 16 is a solenoid valve 26 which is closed in the de-energized state and connects, in the event of a desired pressure decrease in the brake-actuating members 19 and 20, these actuating members to an unpressurized collector line 27 which connects with a port 29 of fluid reservoir 5 via a return line 28. Similarly, brake-actuating members 17 and 18 of the front wheels 13 and 14 are connected separately to collector line 27 via solenoid valves 30 and 31, respectively, which are closed in the de-energized state. This makes it possible to increase or decrease the pressures in brake-actuating members 17 and 18 of the front wheels to different magnitudes separately from each other whereas the pressures in the brake-actuating members 19 and 20 of the rear wheels can only be changed jointly.

Solenoid valves 22, 24 to 26, 30 and 31 are controlled by an antiskid control apparatus not shown, receiving their information from sensors associated with the wheels. The antiskid control apparatus will detect an imminent locked condition of a wheel in time for it to actuate the relevant solenoid valves in order to withdraw pressurized fluid from the associated brake-actuating member and thus lower the pressure. As a result of the reduced braking torque, the wheel will accelerate again and leave the danger area in which lockup may occur. Then the antiskid control apparatus may undertake another pressure increase in the appropriate brake actuating member.

Because valves 22, 24 and 25 which are open in the de-energized state are conventionally constructed such that in the open state only one direction of flow is allowed, or only one direction of flow should be preferably used, each of them is connected in parallel with an associated check valve 32 opening in opposition to the pressure of pressure chambers 6 and 7. In this manner it is ensured that upon termination of a braking action the pressure in wheel cylinders 17 to 20 is allowed to decrease via the associated check valves 32, pressure chambers 6 and 7 and the breather bores of reservoir 5.

Allocated to the brake system described so far is a pressure accumulator 11 which is charged by pump 12 via check valve 33. Suction port 34 of pump 12 communicates with compartment 10 of fluid reservoir 5. In order to filter out any impurities that may be contained in the pressure fluid, a filter 35 is inserted in suction port 34. Further, it is possible to provide in suction port 34 a check valve 36 opening in the direction of pump 12 in order to prevent fluid from being fed in the direction of fluid reservoir 5.

The fluid flow from pump 12 to pressure accumulator 11 is likewise ducted through a valve device 37 which is a pressure-relief valve and with accumulator 11 fully charged returns any excess of fluid supplied to return line 28 via line 38.

In order to prevent any fluid under pressure from travelling down line 38 to line 27 and possibly affect the valve functions, a check valve 39 opening in the direction of return line 28 is provided between collector line 27 and return line 28.

Drive unit 40 for pump 12, may, for example, be the engine of the automotive vehicle. For this purpose, it will be an advantage to flange pump 12 directly to a rotating part of the engine. Advantageously, drive unit 40 for pump 12 could be an electric motor rather than the vehicle engine which is actuated in response to the pressure prevailing in pressure accumulator 11. To this end, the instantaneous pressure of accumulator 11 is signalled via a control line 42 to a pressure switch 41 which actuates the electric motor of drive unit 40 via an electric control line 43. It should be understood that in this arrangement pressure switch 41 requires a hysteresis permitting pressure fluctuations in accumulator 11 of about 30 bars. Thus, for instance, the minimum accumulator pressure could be fixed at 140 bars and the maximum pressure at 170 bars.

Via a pressure line 44 and a solenoid valve 46 which is closed in the de-energized state, accumulator 11 communicates with the inlet 47 of a valve device 45. Valve 46 which is closed in the de-energized state is connected to outlet 49 of valve device 45 via a hydraulic control line 48. Valve 46 which is closed when de-energized is opened under electrical control and will not close until after outlet 49 is unpressurized and this condition has been signalled to the open valve 46 via hydraulic control line 48.

Valve device 45 includes a piston 50 which acts as a hydraulically operated valve member between inlet 47 and outlet 49 in the sense of a pressure reduction. In the embodiment shown, piston 50 is a stepped piston having its first end surface 51 exposed to the pressure of pressure chamber 7. Since piston 50 is sealed to and slides in the housing of valve device 45, outlet 49 is formed at the step 53 between piston 50 and the housing of valve device 45, this outlet communicating with pressure lines 21 and 23, and thus, with pressure chambers 6 and 7 via check valves 55 and 56, respectively. In this embodiment, check valves 55 and 56 are arranged to be openable in opposition to the pressure of pressure chambers 6 and 7.

Outlet 49 is connected to the pressure chamber 57 bounded by the housing of valve device 45 and piston 50 via an axial channel 67 so that the second end surface 52 of piston 50 is acted upon by the pressure of outlet 49. Via a radial channel 68 which overlaps inlet 47 depending on the position of piston 50, fluid is ducted from inlet 47 to outlet 49 and into pressure chamber 57. Radial bore 68 and inlet 47 will overlap to a greater or lesser extent in accordance with the position of piston 50 so that, dependent on the piston position, a pressure will build up in outlet 49 which, starting from zero pressure, may increase up to the pressure of accumulator 11.

Provided in pressure chamber 57 is a stop 58 which limits the open position of piston 50, and thereby provides a defined open condition of the controlled system. Similarly, it is advisable to provide a stop 60 in pressure chamber 59 which is bounded by end surface 51 of piston 50 in order to be able to limit the closed position of piston 50.

Provided just in front of stop 58 is a pressure outlet 61 which is connected to the unpressurized fluid reservoir 5 via line 62, line 38 and return line 28. In the open position of piston 50, i.e., with piston 50 in abutment with stop 58, pressure outlet 61 is closed by piston 50. Piston 50 acts as a valve slide for pressure outlet 61.

The mode of operation of the arrangement of FIG. 1 is as follows.

Application of brake pedal 3 causes actuation of vacuum brake booster 2, its output force being transmitted to master cylinder 1. In pressure chambers 6 and 7 a pressure will build up which travels down to brake-actuating members 17 to 20 through lines 21 and 23. If the antiskid control apparatus (not shown) detects an imminent locked condition of a wheel during a braking action, it will close the associated pressure inlet valve 22, 24 and 25 (open in the de-energized state) and open the associated pressure outlet valve 26, 30 and 31 (closed in the de-energized state) in accordance with the wheel rotational behavior. The pressure in the associated wheel cylinder will drop, the wheel being allowed to accelerate again and leave the danger zone in which it may become locked.

The pressure built up in pressure chamber 7 at the beginning of the braking operation will propagate into pressure chamber 59 and act on end surface 51 of piston 50, holding it in abutment with stop 58 in the position shown. However, because valve 46, which is closed in the de-energized state, is closed during normal brake application, inlet 47 and outlet 49 will remain unpressurized. Only when the antiskid control apparatus has established an imminent lockup and a relevant pressure outlet valve 26, 30 and 31 opens, will this opening signal cause at the same time opening of valve 46 which is closed when de-energized, and the full pressure of accumulator 11 will be present on inlet 47 of valve device 45 via line 44. Because piston 50 is in the open position, the pressure will immediately be present in pressure chamber 57 and in outlet 49. On attainment of the pressure prevailing in pressure chamber 7, however, piston 50 will assume a pressure-balanced state because the pressure acting on end surface 51 is equal to the pressure acting on annular surface 54 in outlet 49 and on end surface 52. Any further, minor, pressure increase will immediately cause a displacement of piston 50 to the left, thus moving radial channel 68 away from under inlet 47 so that inlet 47 will be closed by piston 50. Should the pressure increase have been greater than the pressure prevailing in pressure chamber 7, piston 50 will be shifted an amount sufficient to enable the excess pressure to escape through pressure outlet 61, i.e., piston 50 will assume a defined position with the pressure in pressure chamber 7 constant. The pressure thus metered into outlet 49 corresponds to the pressure in pressure chamber 7 and acts on the relevant pressure chambers 6 and 7 directly via check valves 55, 56.

The antiskid control apparatus which then establishes that the wheel concerned has largely recovered, will again close the associated one of outlet valves 26, 30 and 31, and open the associated one of inlet valves 22, 24 and 25. As a result, a substantial amount of fluid will be required to flow through the associated pressure line in order to adapt the pressure in the associated brake-actuating member to the pressure in the other brake-actuating members. However, because of the arrangement of check valves 55 and 56, this fluid requirement will not be withdrawn from the relevant one of pressure chambers 6 and 7 of master cylinder 1, but rather will enter the associated brake circuit via check valves 55 and 56. The vehicle operator who depresses brake pedal 3 will hardly, if at all, be able to notice this fluid flow in the relevant brake circuit by a different pedal feeling. It is insured in this manner that master cylinder 1 fluid volume cannot become exhausted, no matter how many control cycles are performed.

Also after termination of an antiskid control cycle, valve 46 which is closed when de-energized will remain open because it is not allowed to return to the closed state until outlet 49 is unpressurized. This, however, will be the case only if the vehicle operator releases brake pedal 3 and the braking action is terminated. In this case, the pressure acting on end surface 51 of piston 50 will drop to zero, and the pressure acting on end surface 52 and annular surface 54 will immediately displace the piston to the left, closing inlet 47 and opening pressure outlet 61 fully. There will thus occur a prompt pressure decrease in outlet 49. This will be signalled to valve 46 via hydraulic control line 48 so that it will return again to its closed rest position.

It is to be understood that the valve operation described so far is presented in a highly simplified form in order to make the arrangement more clearly understood. In reality, on opening of valve 46 which is closed when de-energized, piston 50 will reciprocate continuously in order to compensate for the respective pressure fluctuations to maintain a constant output pressure. In the presence of faulty condition, this valve device will operate in a manner similar to constructions known in the art. The antiskid control apparatus will be disabled, making normal braking of the device possible. However, with the antiskid control apparatus disabled, it will also be ensured that valve 46 which is closed when de-energized cannot open with the operation of the brake system continuing.

Figure 2:
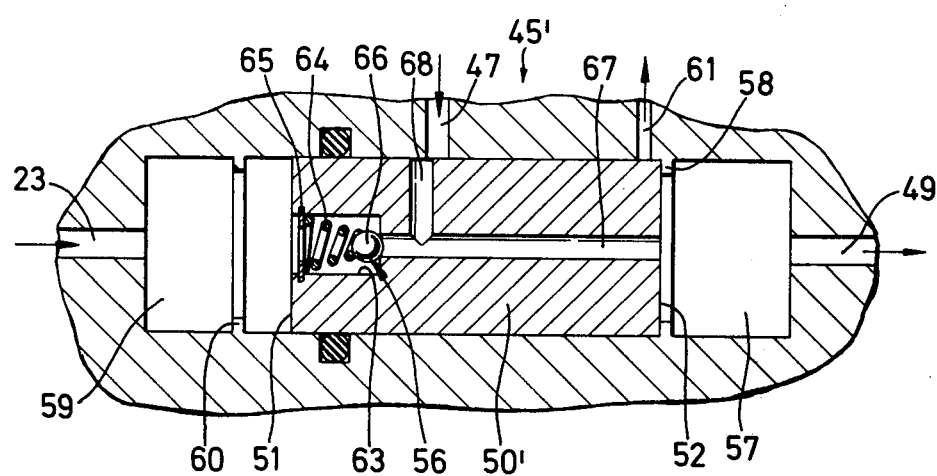
FIG. 2 is a longitudinal cross-sectional view of a modified valve device that may be employed in the hydraulic brake system of FIG. 1.

FIG. 2 shows a more favorable embodiment of a valve device 45 of FIG. 1. A simple piston 50' slides in a housing of valve device 45', and end surfaces 51 and 52 are again exposed to pressure in accordance with the description given above. In this embodiment, pressure outlet 49 is located in pressure chamber 57 which is adapted to be connected to the inlet through channels 67 and 68. Check valve 56 is preferably inserted in an extended bore 63 provided in end surface 51, with bore 63 communicating with channel 67. In a simple embodiment, a spring 64 bearing against a circlip 65 provided in extended bore 63 holds a ball 66 in sealing engagement with a valve seat formed by the channel orifice in bore 63. In contrast to FIG. 1, this embodiment dispenses with the need for an external check valve so that additional fluid ports are avoided which, as sources of errors, might cause a failure of the valve device. Further, this valve device permits a particularly small and accordingly compact design which makes it advantageously suitable for use in a bulky antiskid control apparatus.

While I have described above the principles of my invention in connection with specific apparatus is it to be clearly understood that this description is made only by way of example and not as a limitation to the scope of my invention as set forth in the objects thereof and in the accompanying claims.

I claim:

1. A hydraulic brake system having an antiskid control apparatus comprising:
   a master brake cylinder;
   a fluid return line;
   at least one wheel brake cylinder;
   antiskid control valves coupled to said master cylinder, said wheel cylinder and said return line to connect said wheel cylinder to one of said master cylinder and said return line; and
   a valve device coupled to a fluid source, said master cylinder and said return line to connect fluid from said fluid source to said wheel brake cylinder through a passage in said valve device and at least one check valve opening in opposition to master cylinder pressure, said valve device being controlled by a piston having a first end surface acted upon by said master cylinder pressure in the sense of opening said passage in said valve device and a second end surface acted upon by the pressure of said fluid of said source in the sense of closing said passage in said valve device.

2. A hydraulic brake system having an antiskid control apparatus comprising:
   a master brake cylinder;
   a fluid return line;
   at least one wheel brake cylinder;
   antiskid control valves coupled to said master cylinder, said wheel cylinder and said return line to connect said wheel cylinder to one of said master cylinder and said return line; and
   a valve device coupled to a fluid source, said master cylinder and said return line to deliver fluid from said fluid source to said wheel brake cylinder through at least one check valve opening in opposition to master cylinder pressure, said valve device being controlled by a piston having a first end surface acted upon by said master cylinder pressure in the sense of opening said valve device and a second end surface acted upon by the pressure of said fluid of said source in the sense of closing said valve device;
   said piston acting as a valve slide to connect an inlet in a housing of said valve device coupled to said source to an outlet in said housing coupled to said check valve through a first portion of a channel system contained in said piston, said piston being adapted to close said inlet under predetermined conditions.

3. A system according to claim 2, wherein said fluid source will only provide fluid upon actuation of said master cylinder.

4. A system according to claim 2, wherein said fluid source includes an accumulator having its output connected to said valve device through a valve which is opened at the beginning of a braking action and which is closed upon termination of said braking action.

5. A system according to claim 2, wherein said second surface and said housing define a pressure chamber communicating with said outlet through a second portion of said channel system.

6. A system according to claim 5, wherein said pressure chamber is an outlet chamber for said valve device.

7. A system according to claim 2, wherein said piston closes a fluid connection to said return line when said piston connects said inlet to said outlet and opens said fluid connection when said piston closes said inlet.

8. A system according to claim 2, further including a first stop disposed in said housing adjacent said first end surface and a second stop disposed in said housing adjacent said second end surface to limit the axial displacement of said piston.

9. A system according to claim 2, further including a stop disposed in said housing adjacent said second end surface against which said piston rests in its open position such that said inlet is only partially open.

10. A system according to claim 4, wherein said valve is controlled electromagnetically to close it and hydraulically to open it.

11. A system according to claim 10, wherein said valve is opened by a control signal of said antiskid apparatus and closed when said master cylinder is unpressurized.

12. A system according to claim 2, further including a first stop disposed adjacent said first end surface and a second stop disposed adjacent said second end surface to limit the axial displacement of said piston.

13. A system according to claim 2, wherein said check valve is disposed in said piston.

* * * * *